United States Patent [19]
Kuisma

[11] Patent Number: 5,276,920
[45] Date of Patent: Jan. 4, 1994

[54] ANTENNA SELECTION SWITCH FOR A DIVERSITY ANTENNA

[75] Inventor: Erkki Kuisma, Halikko, Finland

[73] Assignee: Nokia Mobile Phones Ltd., Salo, Finland

[21] Appl. No.: 638,187

[22] Filed: Jan. 7, 1991

[30] Foreign Application Priority Data

Jan. 18, 1990 [FI] Finland ............................. 900302

[51] Int. Cl.$^5$ .............................................. H04B 7/02
[52] U.S. Cl. ..................... 455/101; 455/129; 455/277.1; 455/282; 455/289
[58] Field of Search .................. 455/272, 273, 277.1, 455/280–

[56] References Cited

U.S. PATENT DOCUMENTS 4,984,296 1/1991 Schotz ........................ 455/273 X
5,170,493 12/1992 Roth .............................. 455/82

FOREIGN PATENT DOCUMENTS 0136433 7/1985 Japan ............................. 455/272
0309032 12/1988 Japan ............................. 455/282

Primary Examiner—Reinhard J. Eisenzopf
Assistant Examiner—Chi Pham
Attorney, Agent, or Firm—Darby & Darby

[57] ABSTRACT

The invention relates to a circuitry by means of which it is possible to switch to a mobile telephone that antenna out of two or more antennae which has the best signal, without substantial alterations in the mobile telephone itself. According to the invention, the antennae (A, B), the antenna selection switch (2) and the peripheral circuits (5, 6) connected to it constitute an integrated part which is separate from the actual mobile telephone (1) but can be coupled to it by means of an antenna cable (3), and the antenna cable (3) is coupled to the radio part of the mobile telephone (1) by mediation of a signal combining circuit (4) which transfers to the antenna cable (3) the supply voltage (V) and the antenna selection switch (2) control pulse, and transfers and selects the RF signal.

5 Claims, 1 Drawing Sheet

ANTENNA SELECTION SWITCH FOR A DIVERSITY ANTENNA

BACKGROUND OF THE INVENTION

The present invention is directed to circuitry for a switch which selects one of two or more mobile telephone antennas which has the best signal, and, more particularly, to such a circuit which operates without having to make any alterations in the mobile telephone itself.

In certain cases it is advantageous for a radio telephone to select one of several antennas, each antenna having different reception and transmission characteristics. The best antenna at each given time can be selected according to the signals being received by the radio telephone and is switched (either manually or automatically) to the radio part of the mobile telephone. This principle is called antenna diversity.

In the committee preparing the system specifications for the dual mode radio telephone system which will be adopted in the U.S.A., a proposal has been made to make mobile station receiver diversity optional, e.g., the use of a diversity antenna would not be compulsory. One advantage of antenna diversity is that a significant improvement in transfer quality when data which mediates a service is being transmitted from a support station to a mobile station (for example, at a rate of 9.6 kb/s) because an antenna intended for the reception of this data signal is used, rather than the same antenna for mediating both speech and data.

For example, prior art car phones using a diversity antenna comprise the mobile telephone itself, two antenna, and a switch between the telephone and the antenna. This switch allows the mobile telephone to be switched to either one of the antenna. The switch is a controllable switch in the mobile telephone and receives its control from the mobile telephone logic via a separate control line. A control signal from the control line cause the antenna to be switched according to the best signal obtained. Field intensity, for example, is a suitable criterion on which to base this selection. In a digital time division multiplex system (TDMA), for example, it is advantageous to make the selection before the time interval for reception, since antenna switching carried out within that time interval causes error bursts in the bit queue received.

SUMMARY OF THE INVENTION

One disadvantage of this prior-art system is that it is necessary to incorporate into each mobile telephone with a diversity antenna two sets of antenna connectors and an antenna switch. This involves expensive and, from the viewpoint of the operation of the mobile telephone, space-consuming additional components. Therefore, the object of the present invention is to eliminate these disadvantages and to provide a circuit in which a mobile telephone can be used with either antenna diversity or without it, i.e., the diversity function is not built into the mobile telephone itself.

This is achieved by the present invention by removing the diversity antenna, the antenna selection switch, and the peripheral circuits connected from the radio telephone itself and put them in a separate unit which can be selectively coupled to the radio telephone by an antenna cable.

BRIEF DESCRIPTION OF THE DRAWING

The invention is described in greater detail, with reference to the accompanying FIGURE, which depicts a simplified diagram of the principle of the arrangement according to the invention.

DESCRIPTION OF THE PREFERRED EMBODIMENT

Figure 1:
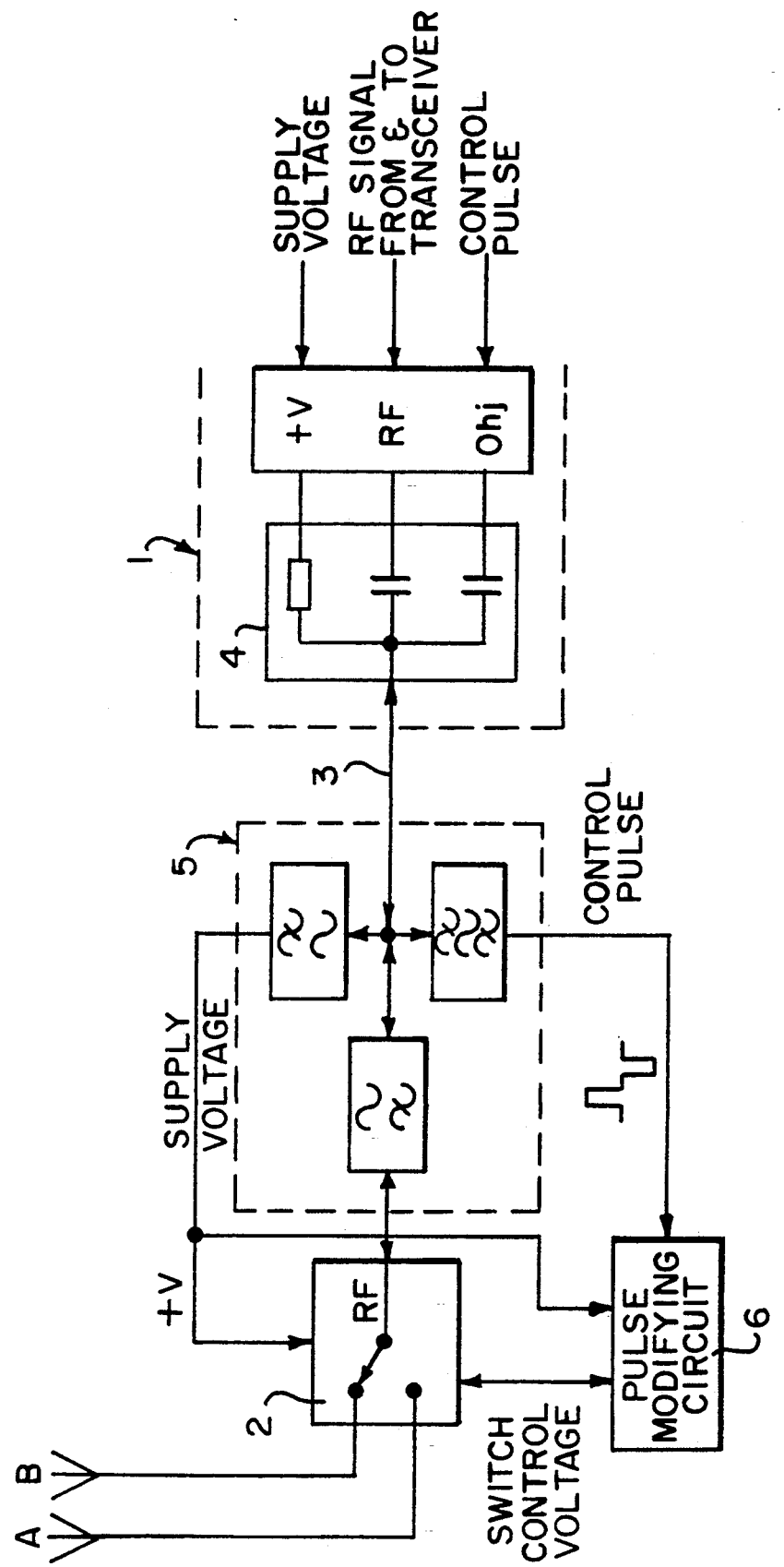

Switch 2, receives the signal arriving from antenna A or antenna B. The signal is switched to the antenna cable 3. The signal is carried by the cable to a combining circuit 4, located in the radio telephone 1. The signal is next directed further to the radio part of the telephone 1. The antenna A and B, the antenna selection switch 2, a pulse modifying circuit 6, and a signal separation circuit 5 can be integrated into one entity and be located, for example, inside the base of the diversity antenna A, B. All signals associated with the diversity antenna, i.e., the supply voltage, the radio frequency signal, and the switch 2 control signal, are carried from the vehicle telephone 1 in the cable 3. The vehicle telephone 1 includes a signal combining circuit 4 which can be made simply and inexpensively using conventional components and techniques. The coaxial cable 3 is connected to the signal combining circuit 4 by a conventional antenna connector. Thus, the supply voltage V, an RF signal, and a switch 2 control signal obtained from the telephone's circuitry are introduced to combining circuit 4 from the telephone in the vehicle. The antenna can be selected and the corresponding control signal generated by a conventional program using as the criterion, for example, a field intensity measurement from each antenna, preferably before the time interval for reception.

The signals and supply voltage are combined in the combining circuit 4 for the antenna cable 3, which carry the signals to the integrated separation circuit 5 of the diversity antenna. In it the supply voltage is separated using, for example, a low-pass filter and is applied as the supply voltage to the switch 2 and the pulse-modifying circuit 6. The RF signal is separated by using a high-pass filter and is applied to the antenna switch 2. The control pulses can be separated in a band-pass filter, from which they are taken to the pulse modifying circuit 6. The form of the separated control pulses may be a rectangular wave varying on both sides of the zero level, or some other waveform not containing direct-current voltage. All of the above-mentioned filters can be made using simple RC or LC circuits. The function of circuit 6, which forms the control pulses, is to convert the band-pass type control pulses to logic-level control voltages, for example, through the switch 2 changing its state at each control pulse. Other methods can, of course, also be used.

The apparatus described above is a simple way to eliminate the disadvantages of prior-art mobile telephones which use a diversity antenna in the mobile telephone itself, and to achieve a situation in which the user of a vehicle telephone can, when acquiring a mobile telephone, choose whether he wishes to have a diversity antenna, which produces better quality, but which is also more expensive, or whether he will settle for one antenna. In each case the telephone itself is the same. This means that the user of the telephone can later connect a diversity antenna to his mobile telephone, for example, when shifting to the use of data transfer services in a telephone network system.

I claim:

1. A circuit for a diversity antenna in a mobile telephone having at least two antennas remote from the mobile telephone, comprising:
   (a) a signal combining circuit in the mobile telephone for combining a supply voltage, a radio frequency signal, and a control pulse signal;
   (b) a single cable for transmitting the combined supply voltage, radio frequency signal, and control pulse signal; and
   (c) an antenna selection unit remote from the mobile telephone connected at one end to the single cable, the antenna selection unit including:
      (1) a signal separation circuit for separating the combined supply voltage, radio frequency signal, and control pulse signal; and
      (2) switch means responsive to the separated supply voltage and separated control pulse signal to selectively connect one of the at least two antennas to the single cable.

2. The diversity antenna circuit of claim 1, wherein the signal separation circuit and the signal combining circuit are made up of filters.

3. The diversity antenna circuit of claim 1 wherein the switch means includes a pulse modifying circuit for converting the switch control pulses coming from the signal separation circuit into logic-level switch control voltages.

4. The diversity antenna circuit of claim 1, wherein the switch means select one of the antenna according to a measurement of the field intensity of the antennae.

5. The diversity antenna circuit of claim 2, wherein the separation circuit includes a low-pass filter for separating the supply voltage, a band-pass filter for separating the control pulse signal, and a high-pass filter for separating the radio frequency signal.

* * * * *